US007478530B2

(12) United States Patent
Ueda

(10) Patent No.: US 7,478,530 B2
(45) Date of Patent: Jan. 20, 2009

(54) HYDRAULIC CIRCUIT FOR WORKING MACHINE

(75) Inventor: Koji Ueda, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 267 days.

(21) Appl. No.: 11/422,503

(22) Filed: Jun. 6, 2006

(65) Prior Publication Data

US 2006/0288863 A1 Dec. 28, 2006

(30) Foreign Application Priority Data

Jun. 22, 2005 (JP) ............................ 2005-181926

(51) Int. Cl.
*F16D 31/02* (2006.01)
*F01B 29/04* (2006.01)

(52) U.S. Cl. ............................. 60/399; 60/328; 91/34; 91/459; 91/461

(58) Field of Classification Search .................. 60/328, 60/399, 403; 91/1, 34, 459, 461
See application file for complete search history.

(56) References Cited

U.S. PATENT DOCUMENTS 3,830,137 A * 8/1974 Wurth et al. ..................... 91/1
6,615,581 B2 * 9/2003 Kusuyama ................... 60/328

FOREIGN PATENT DOCUMENTS

JP 3221268 8/2001
JP 2002-294758 10/2002

* cited by examiner

*Primary Examiner*—Michael Leslie
(74) *Attorney, Agent, or Firm*—Oblon, Spivak, McClelland, Maier & Neustadt, P.C.

(57) ABSTRACT

A hydraulic circuit for a working machine includes hydraulic actuators which respectively drive a plurality of kinds of working devices and which are driven by a drive circuit having circuit states that correspond to the working devices, a directional control valve unit which, when one of the working devices is attached to the attachment, switches in response to a signal from a controller to select one of the circuit states, a detection sensor that detects the actual circuit state, and a display operated by the controller. The controller activates the display when the detected actual circuit state and the selected circuit state do not match.

7 Claims, 5 Drawing Sheets

HYDRAULIC CIRCUIT FOR WORKING MACHINE

BACKGROUND OF THE INVENTION

1. Field of the Invention

The present invention relates to a hydraulic circuit for a working machine, such as a crushing machine, that has an attachment to which working devices are selectively attached.

2. Description of the Related Art

A typical crushing machine includes a base machine and an attachment which is mounted on the base machine and to which working devices, such as a compression crusher and a breaker, are selectively attached at an end of the attachment depending on the kind of work to be performed. In the following description, work using the breaker is called breaking.

In this case, the compression crusher and the breaker use different hydraulic actuators, and the actuators must be provided with respective oil supply/discharge passages. Accordingly, a hydraulic circuit must be switched depending on the kind of the working device to be used.

FIGS. 6A and 6B are diagrams illustrating a structure in which the circuit is switched manually. FIG. 6A shows a circuit state for compression crushing and FIG. 6B shows a circuit state for breaking.

Referring to FIGS. 6A and 6B, the structure includes a hydraulic pilot-operated directional control valve 5 operated by a remote control valve 6, a manual directional control valve (three-way valve) 7, a hydraulic pump 8 that functions as a hydraulic power source for actuators, a tank T, and a primary hydraulic power source 11 for the remote control valve 6. When the control valve 5 is operated, oil is supplied from the hydraulic pump 8 to a compression-crusher cylinder 9 or a breaker cylinder 10, and the compression-crusher cylinder 9 or the breaker cylinder 10 is operated accordingly.

As shown in FIG. 6A, when compression crushing is performed, similar to a double acting cylinder circuit, input and output ports of the compression-crusher cylinder 9 are connected to the hydraulic pump 8 and the tank T via the control valve 5.

When breaking is performed, the power of the breaker is reduced if a back pressure is applied to a return line of the breaker cylinder 10 due to a throttle effect of the control valve 5, and there is a risk that the breaker cannot be operated. In addition, pulsation occurs in an oil cooler (not shown) and there is risk that the oil cooler will be damaged.

Therefore, as shown in FIG. 6B, when breaking is performed, the directional control valve 7 is operated so that the return line of the breaker cylinder 10 is directly connected to the tank T.

A technique for automatically switching the circuit state with a directional valve depending on the kind of the working device without using the manual directional control valve 7 shown in FIGS. 6A and 6B is disclosed in Japanese Unexamined Patent Application Publication No. 2002-294758.

Also in this case, there is a risk that a fail, such as a breakage of a line connecting a controller and a solenoid valve or a breakdown of the controller, will occur in an electrical or hydraulic control system of the directional control valve that functions as an automatic control device. Accordingly, there is a possibility that the circuit state expected by the operator and the actual circuit state do not match.

Therefore, the following problems occur:

(i) If the actual circuit state is set to the state for compression crushing even though breaking (circuit state for breaking) is selected by a mode switch operation performed by the operator and breaking is performed, the back pressure in the return line is increased as described above and there is a risk that the power of the breaker will be reduced or the breaker will stop.

(ii) If the actual circuit state is set to the state for breaking even though compression crushing (circuit state for compression crushing) is selected by the operator and compression crushing is performed, the compression-crusher cylinder cannot be reciprocated and operates in only one direction since one of the lines of the cylinder is directly connected to the tank.

SUMMARY OF THE INVENTION

Accordingly, an object of the present invention is to provide a hydraulic circuit for a working machine that performs a fail-safe function when actual and expected circuit states do not match.

According to the present invention, a hydraulic circuit for a working machine basically has the following structure.

That is, according to an aspect of the present invention, a hydraulic circuit for a working machine including a base machine and an attachment mounted on the base machine includes a controller that generates a signal depending on a selecting operation performed by an operator; hydraulic actuators for driving respective working devices, the hydraulic actuators being driven by a drive circuit having two kinds of circuit states that correspond to the working devices; a directional control valve unit which, when one of the working devices is attached to the attachment, switches in response to the signal from the controller to select one of the two kinds of circuit states; a detector for detecting the actual circuit state; and a display activated by the controller. The controller activates the display when the actual circuit state detected by the detector and the selected circuit state do not match.

When the circuit state expected by the operator and the actual circuit state do not match, the display is activated to inform the operator of the discrepancy. Accordingly, a fail-safe function is provided when the operator informed of the discrepancy stops the operation.

In a hydraulic circuit for a working machine according to another aspect of the present invention, working devices driven by different hydraulic actuators are selectively attached to an attachment mounted on a base machine, the hydraulic actuators being driven by a drive circuit having two kinds of circuit states that correspond to the working devices. A directional control valve unit selects one of the circuit states by switching in response to a signal generated by a controller depending on a selecting operation performed by an operator. The hydraulic circuit has the following features:

(A) A hydraulic pilot-operated directional control valve that functions as a common control valve for controlling the operation of the hydraulic actuators for driving the working devices and that is operated by a remote control valve is provided.

(B) The directional control valve unit includes a hydraulic pilot-operated main directional control valve that switches depending on whether a pilot pressure is supplied or shut off to generate the two kinds of circuit states and first and second solenoid valves that are selectively operated on the basis of an electric signal from a control means.

(C) Each of the solenoid valves is connected to the pilot hydraulic power source and applies a pilot pressure from the pilot hydraulic power source to the main directional control valve when the solenoid valve is operated.

(D) The pilot pressure from the pilot hydraulic power source is supplied to the remote control valve that operates the common control valve as a primary pressure when the solenoid valves are operated.

In this structure, when the solenoid valves included in the directional control valve unit are activated, the pilot pressure from the pilot hydraulic power source is supplied to the remote control valve via the directional control valve unit as the primary pressure. Therefore, if an abnormality like a breakage of electric lines connecting the controller to the solenoid valves occurs and the solenoid valves cannot be operated, the supply of the primary pressure to the remote control valve stops.

Therefore, the common control valve cannot be operated even when the remote control valve is operated (or the common control valve returns to neutral if the common control valve is being operated). As a result, the operation of the hydraulic actuator is automatically stopped and thus the fail-safe function is provided.

In addition, since the solenoid valves included in the directional control valve unit are used to shut off the primary pressure of the remote control valve, the structure is simpler than that in the case in which, for example, an additional solenoid shutoff valve is provided at a primary side of the remote control valve and the shutoff valve is operated when a fail is detected.

BRIEF DESCRIPTION OF THE DRAWINGS

FIG. 6A shows a circuit state for compression crushing and FIG. 6B shows a circuit state for breaking.

DESCRIPTION OF THE PREFERRED EMBODIMENTS

Figure 4:
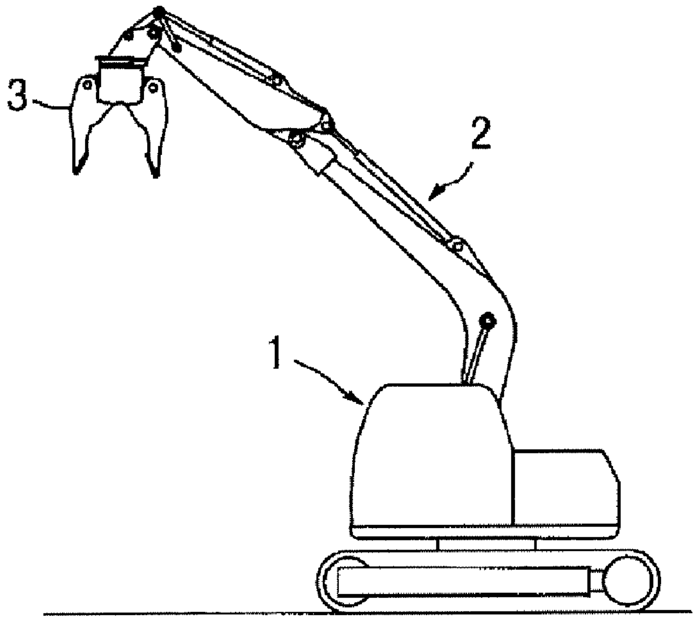
FIG. 4 is a schematic side view of a crushing machine in which an opening/closing compression crusher is attached to an attachment.
Figure 5:
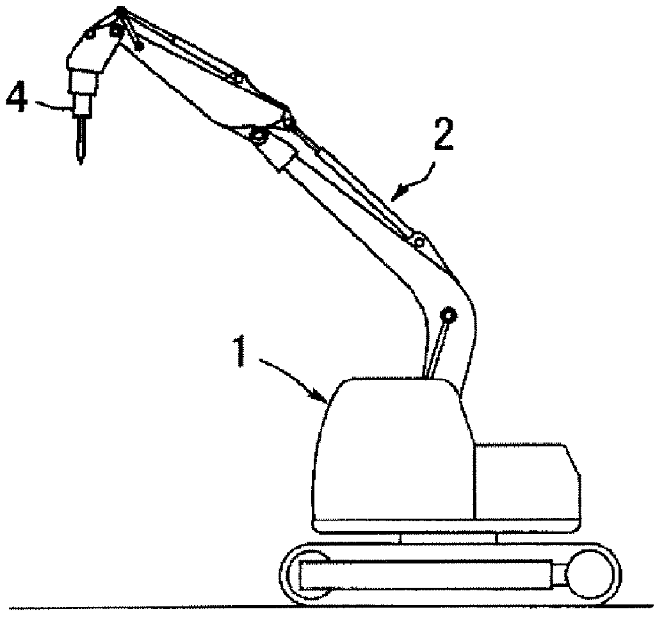
FIG. 5 is a schematic side view of the crushing machine in which a breaker is attached to the attachment.
Figure 6A:
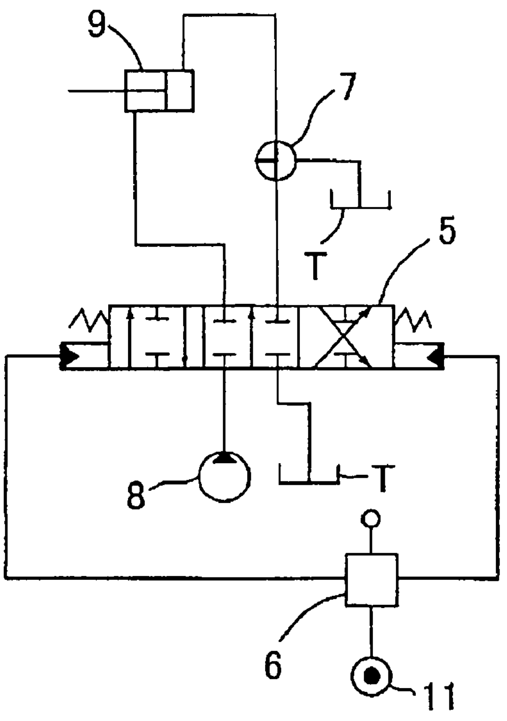
FIG. 6A PRIOR ART
FIGS. 6A and 6B are diagrams illustrating the structure of a circuit that is switched with a manual directional control valve, where
Figure 6B:
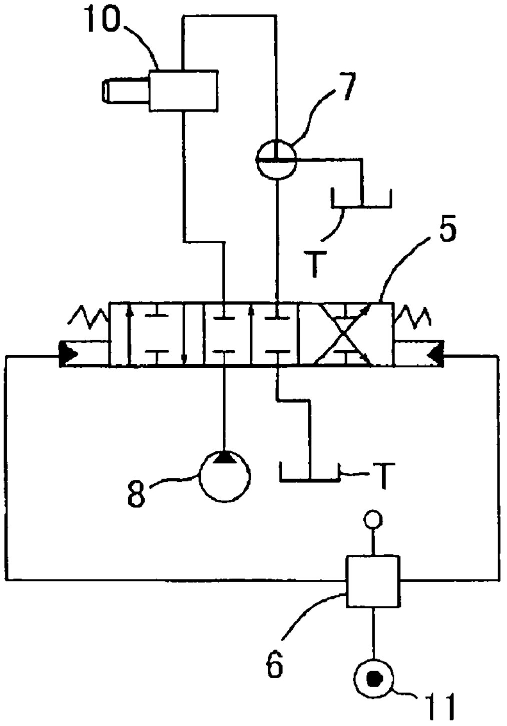
FIG. 6B PRIOR ART

FIGS. 4 and 5 illustrate a crushing machine including a hydraulic excavator as a base body and a hydraulic circuit for a working machine according to the present invention.

The crushing machine includes a crawler type base machine 1 and a bendable attachment 2 mounted on the base machine 1. In the embodiments described below, an opening/closing compression crusher 3 (see FIG. 4) called a nibbler and a vibrating breaker 4 (see FIG. 5) are explained as examples of working devices.

The opening/closing compression crusher 3 called a nibbler or the vibrating breaker 4 is attached to an end of the attachment 2 as a working device depending on the kind of work to be performed.

In this case, the compression crusher 3 and the breaker 4 use different hydraulic actuators, and the actuators must be provided with respective oil supply/discharge passages. Accordingly, a hydraulic circuit must be switched depending on the attached working device.

Hydraulic circuits for working machines according to embodiments of the present invention that provide a fail-safe function will be described below with reference to the accompanying drawings.

Figure 1:
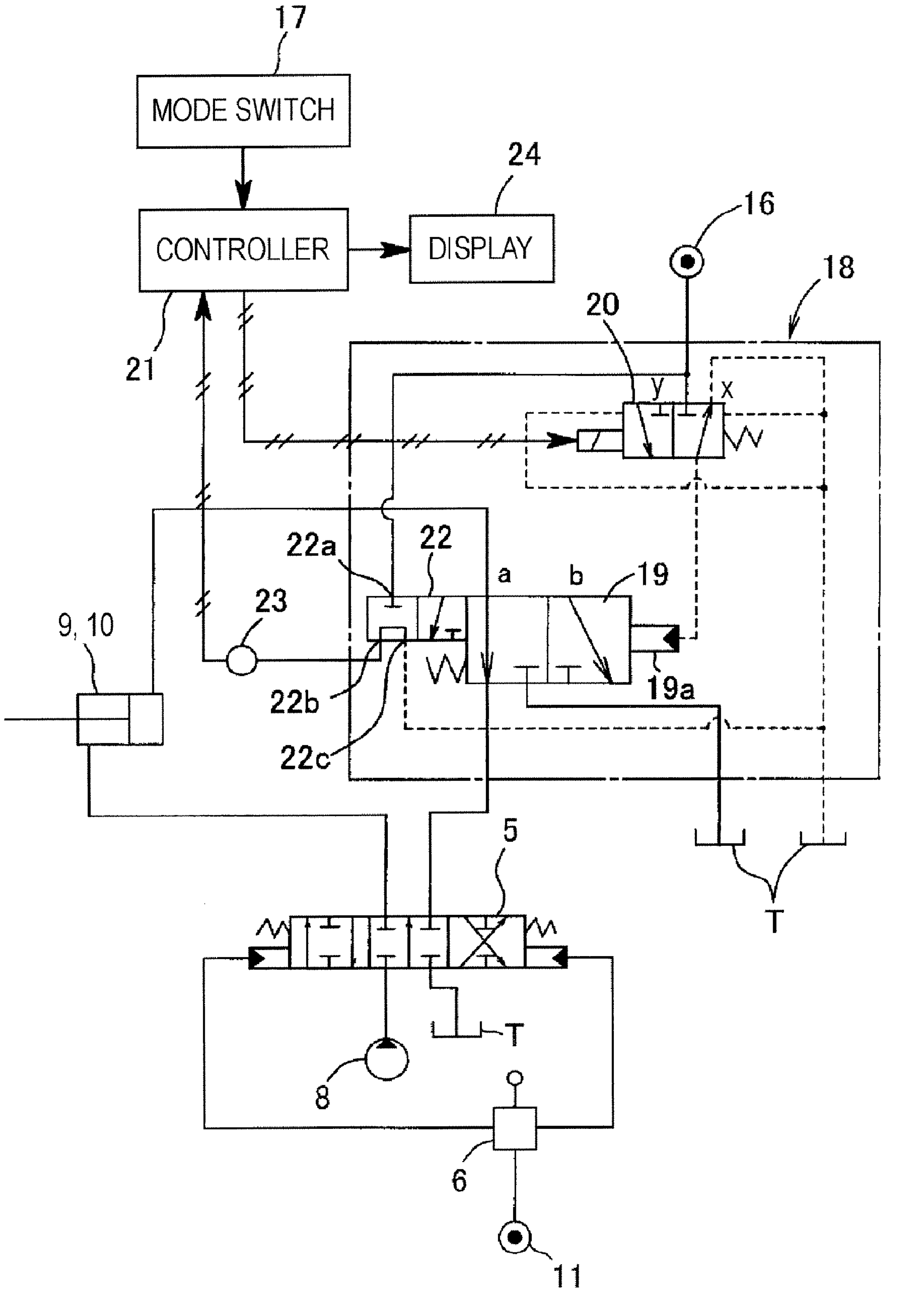
FIG. 1 is a diagram illustrating a circuit structure according to a first embodiment of the present invention.

First Embodiment (see FIG. 1)

Referring to FIG. 1, a directional control valve unit 18 includes a hydraulic pilot-operated main directional control valve 19 that switches between a compression-crushing position a and a breaking position b and a solenoid valve 20 that switches the main valve 19 on the basis of an electric signal from a controller 21 that functions as control means. The solenoid valve 20 switches between a position y for supplying a pilot pressure to the main valve 19 and a position x for shutting off the pilot pressure on the basis of the electric signal from the controller 21.

According to the present invention, detecting means detects the switch state of the main valve 19 as the actual circuit state. Preferably, the detecting means is structured such that the main valve 19 included in the directional control valve unit 18 has a pressure port connected to a hydraulic power source at one end of the main valve 19 and a pressure sensor is connected to the pressure port. The detecting means may include, for example, a pressure sensor 23 which will be described below.

In this case, since the state of the main valve 19 included in the directional control valve unit 18 is detected as the actual circuit state, the structure of the detecting means can be made simple. In particular, when the pressure sensor 23 is used, the pressure sensor 23 simply detects whether or not a pressure is applied to the pressure port of the main valve 19. Therefore, the detecting means is small and inexpensive, and can easily be installed in the circuit.

The basic structure and operation (circuit-state-switching operation) performed by the directional control valve unit 18 will be described below.

The solenoid valve 20 switches between the compression-crushing position x at which the pilot pressure of a pilot hydraulic power source 16 is not supplied to a pilot port 19*a* of the main valve 19 (that is, for connecting the port 19*a* to a tank T) and the breaking position y at which the pilot pressure is supplied to the pilot port 19*a*. In this structure, when a mode switch 17 as a switch for changing modes is switched to compression-crushing, the controller 21 does not transmit the electric signal to the solenoid valve 20. Therefore, the solenoid valve 20 and the main valve 19 are switched to the compression-crushing positions x and a, respectively, as shown in FIG. 1.

Accordingly, lines of the compression-crusher cylinder 9 are connected to a hydraulic pump 8 and the tank T via a control valve 5 (circuit state for compression crushing).

When the mode switch 17 is switched to breaking, the controller 21 transmits the electric signal to the solenoid valve 20 so that the solenoid valve 20 switches to the breaking position y. Therefore, the main valve 19 also switches to the breaking position b.

Accordingly, the return line of the breaker cylinder 10 is directly connected to the tank T without passing through the control valve 5 (circuit state of for breaking).

In the first embodiment, the main valve 19 included in the directional control valve unit 18 has a sub-spool 22 that moves together with a spool (main spool) of the main valve 19.

The sub spool 22 has input and output ports 22*a* and 22*b* and a tank port 22*c*.

The input port 22*a* is connected to the pilot hydraulic power source 16 and the tank port 22*c* is connected to the tank T. When the main valve 19 is switched from the compression-crushing position a shown in the figure to the breaking position b, the input and output ports 22*a* and 22*b* communicate with each other and the pressure of the pilot hydraulic power source 16 is supplied to the output port 22*b*.

The output port 22*b* is connected to the pressure sensor 23 and the pressure sensor 23 outputs a signal to the controller 21.

Accordingly, whether the main valve 19 is at the compression-crushing position a or the breaking position b, that is, the actual circuit state, can be detected on the basis of whether or not the pressure is applied to the output port 22*b*.

In addition, the controller 21 is connected to a display (lamp, buzzer, etc.) 24 that functions as display means. As is clear from the fact that a buzzer is mentioned as an example of the display 24, the display 24 is not limited to a visual display that can be presented on a screen or the like. For example, other means for attracting an attention, such as an alarm, may also be used as the display 24 as long as the operator can be informed of the actual circuit state by the activated display 24.

The controller 21 compares the signal from the pressure sensor 23 that represents the actual circuit state with an operation signal of the mode switch 17 that represents the circuit state expected by the operator. If the two signals do not match, that is, when the circuit is set for breaking even through compression crushing is selected by the operator or when the circuit is set for compression crushing even through breaking is selected by the operator, the display 24 is activated.

Thus, when an abnormality like a line breakage occurs in a control system of the directional control valve unit 18, the operator can be informed of the situation by the display. Accordingly, the operator can stop the operation of the control valve 5 so that various troubles caused by the discrepancy between the expected and actual circuit states can be avoided.

In the above-described structure, a pressure switch may be used instead of the pressure sensor 23.

Figure 2:
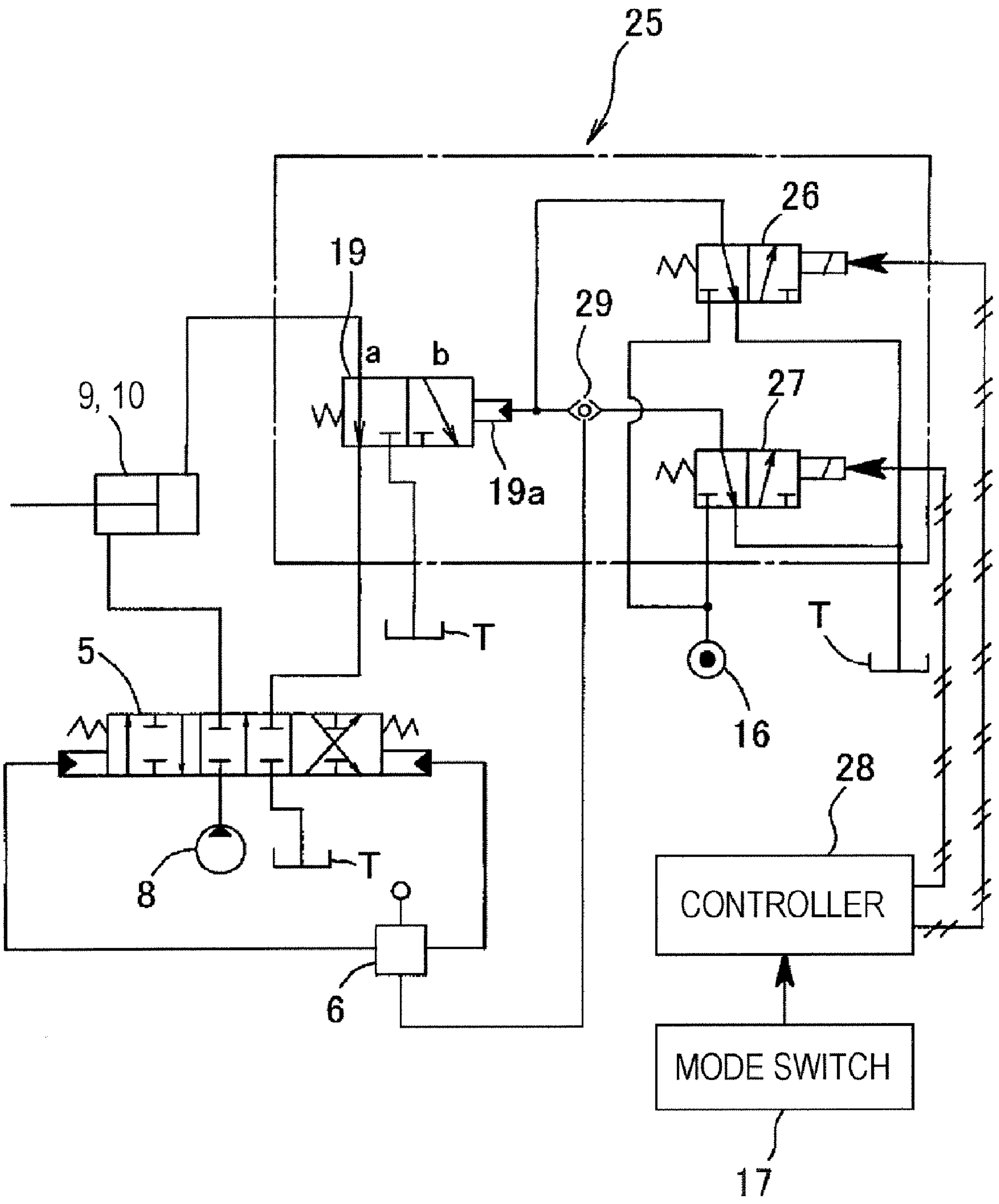
FIG. 2 is a diagram illustrating a circuit structure according to a second embodiment of the present invention.

Second Embodiment (see FIG. 2)

In the first embodiment, the display is activated when the expected and actual circuit states do not match. In comparison, in a second embodiment, the operation of a compression-crusher cylinder 9 or a breaker cylinder 10 is stopped automatically when an abnormality occurs.

According to the second embodiment, a directional control valve unit 25 includes a hydraulic pilot-operated main directional control valve 19 and first and second solenoid valves 26 and 27 for breaking and compression crushing, respectively, that are selectively operated by an electric signal transmitted from a controller 28 in accordance with the operation of a mode switch 17.

The solenoid valves 26 and 27 are both connected to a pilot hydraulic power source 16. When the first solenoid valve 26 is operated, a pilot pressure of the pilot hydraulic power source 16 is supplied to a pilot port 19*a* of the main valve 19 so that the main valve 19 is switched from a compression-crushing position a to a breaking position b.

In addition, when the solenoid valves 26 and 27 are operated, the pilot pressure is output from output ports thereof and is supplied to a remote control valve 6 for controlling a control valve 5 via a shuttle valve 29 as a primary pressure.

In this structure, when the solenoid valves 26 and 27 are operated normally, the primary pressure is supplied to the remote control valve 6 via the operated solenoid valve 26 or 27. Accordingly, the control valve 5 is switched in accordance with the operation of the remote control valve 6 and the compression-crusher cylinder 9 or the breaker cylinder 10 is operated.

However, if an abnormality like a breakage of electric lines connecting the controller 28 to the solenoid valves 26 and 27 occurs and the solenoid valves 26 and 27 cannot be operated, the supply of the primary pressure to the remote control valve 6 stops.

More specifically, if an abnormality occurs while breaking is selected, the first solenoid valve 26 cannot be operated and the pilot pressure is not output from the solenoid valve 26. Therefore, the primary pressure of the remote control valve 6 is shut off.

Similarly, if an abnormality occurs while compression crushing is selected by the mode switch 17, the second solenoid valve 27 cannot be operated. Therefore, also in this case, the primary pressure of the remote control valve 6 is shut off.

Accordingly, the control valve 5 cannot be operated even when the remote control valve 6 is operated (or the control valve 5 returns to neutral if the control valve 5 is being operated). As a result, the compression-crusher cylinder 9 or the breaker cylinder 10 is automatically stopped, and thus the fail-safe function is provided.

According to the present embodiment, the solenoid valves 26 and 27 included in the directional control valve unit 25 are used to shut off the primary pressure of the remote control valve 6. Therefore, the structure is simpler than that in the case in which, for example, an additional solenoid shutoff valve is provided at a primary side of the remote control valve 6 and the shutoff valve is operated when a fail is detected.

Thus, according to the present embodiment, operation-stopping means for stopping the operation of the compression-crusher cylinder 9 or the breaker cylinder 10, which functions as a hydraulic actuator, is provided. The controller 28 that functions as control means causes the operation-stopping means to stop the operation of the compression-crusher cylinder 9 or the breaker cylinder 10 when the actual circuit state and the selected circuit state do not match.

Thus, when the actual and selected circuit states do not match, the operation of the compression-crusher cylinder 9 or the breaker cylinder 10 can be automatically stopped by the operation-stopping means in addition to activating a display. Accordingly, the reliability of the fail-safe function can be increased. In addition, when the display and automatic stopping are performed simultaneously, the operator can reliably recognize the discrepancy between the expected and actual circuit states (occurrence of a fail). Therefore, recognition of the cause and repair can be facilitated.

Figure 3:
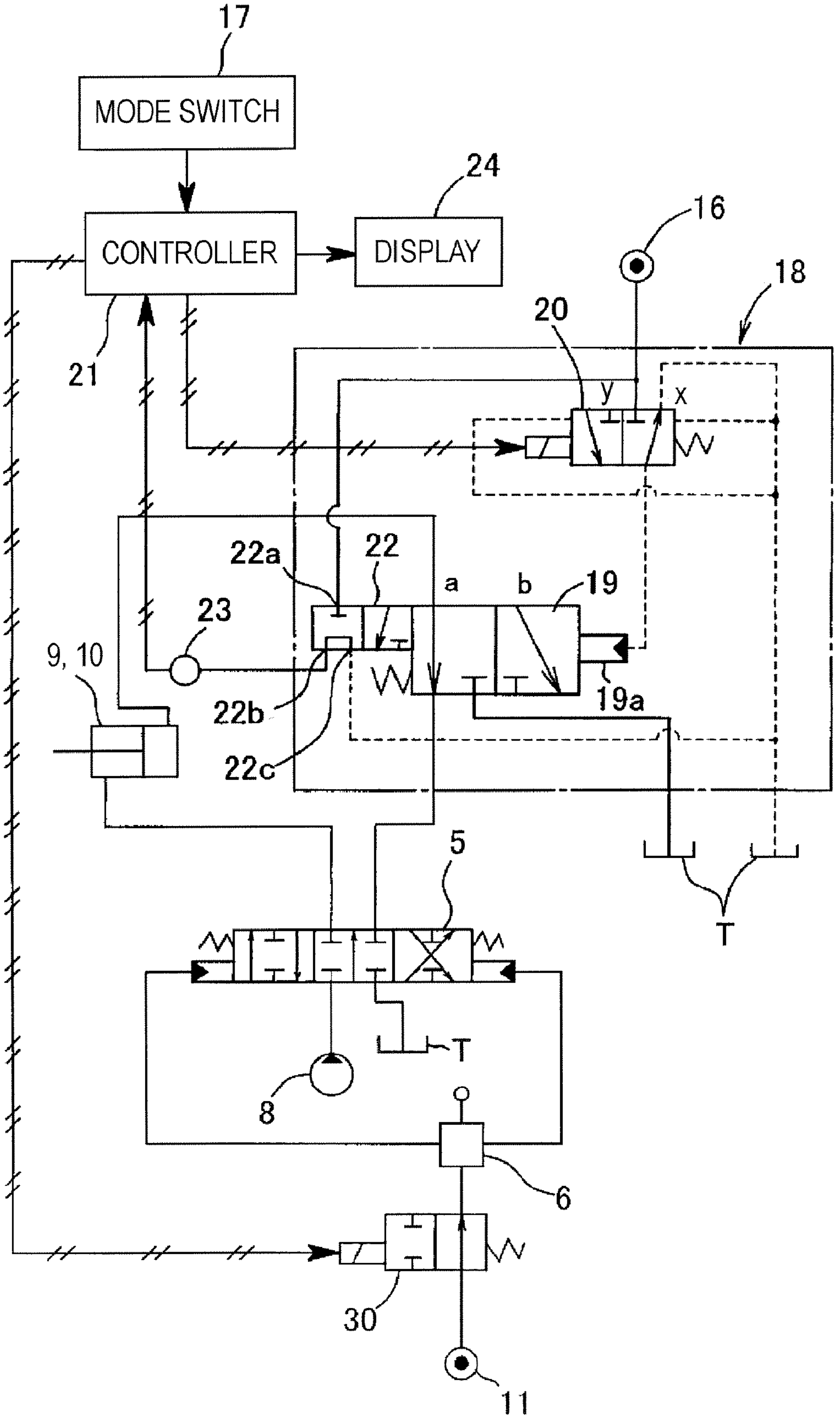
FIG. 3 is a diagram illustrating a circuit structure according to a third embodiment of the present invention.

Third Embodiment (see FIG. 3)

In the third embodiment, the display function described in the first embodiment and the automatic stopping function described in the second embodiment are both performed when an abnormality occurs.

More specifically, the circuit structure according to the first embodiment is basically applied, and an additional solenoid shutoff valve 30 is provided at a primary side of a remote control valve 6. In this case, when the actual and expected circuit states do not match, in addition to activating a display 24, the shutoff valve 30 is activated by a signal from a controller 21 so that the primary pressure of the remote control valve 6 is shut off.

Accordingly, since the display 24 is activated and the operation of a hydraulic actuator (a compression-crusher cylinder 9 or a breaker cylinder 10) is automatically stopped simultaneously, the reliability of the fail-safe function can be increased. In addition, since the automatic stopping and display are simultaneously performed, the operator can reliably recognize the discrepancy between the expected and actual circuit states (occurrence of a fail). Therefore, recognition of the cause and repair can be facilitated.

In the above-described embodiments, the compression crusher and the breaker are explained as examples of working devices that can be selectively attached. However, other various combinations of devices can be applied as long as the devices are driven by different hydraulic actuators and it is necessary to switch the circuit state depending on the actuator to be used.

Although the invention has been described with reference to the preferred embodiments in the attached figures, it is noted that equivalents may be employed and substitutions made herein without departing from the scope of the invention as recited in the claims.

What is claimed is:

1. A hydraulic circuit for a working machine including a base machine and an attachment mounted on the base machine, the hydraulic circuit comprising:

control means that generates a signal depending on a selecting operation performed by an operator;

hydraulic actuators for driving respective working devices, the hydraulic actuators being driven by a drive circuit having two kinds of circuit states that correspond to the working devices;

a directional control valve unit which, when one of the working devices is attached to the attachment, switches in response to the signal from the control means to select one of the two kinds of circuit states;

detecting means for detecting the actual circuit state; and display means activated by the control means, wherein the control means activates the display means when the actual circuit state detected by the detecting means and the selected circuit state do not match.

2. The hydraulic circuit according to claim 1, wherein the number of kinds of the working devices is two.

3. The hydraulic circuit according to claim 1, wherein the directional control valve unit includes a hydraulic pilot-operated main directional control valve and a solenoid valve that switches between a position at which a pilot pressure is supplied to the main directional control valve and a position at which the pilot pressure is not supplied to the main directional control valve on the basis of an electric signal from the control means, and wherein the detecting means detects a state of the main directional control valve as the actual circuit state.

4. The hydraulic circuit according to claim 3, wherein the main directional control valve included in the directional control valve unit has a pressure port connected to a hydraulic power source at one end of the main directional control valve and the detecting means detects a pressure at the pressure port as the actual circuit state.

5. The hydraulic circuit according to claim 1, further comprising:

operation-stopping means for stopping the operation of the hydraulic actuators, wherein the control means causes the operation stop means to stop the operation of the hydraulic actuators when the actual circuit state and the selected circuit state do not match.

6. The hydraulic circuit according to claim 5, further comprising:

a hydraulic pilot-operated directional control valve that functions as a common control valve for controlling the operation of the hydraulic actuators for driving the working devices, wherein the operation-stopping means stops applying a pilot pressure to the common control valve.

7. A hydraulic circuit for a working machine including a base machine and an attachment mounted on the base machine, the hydraulic circuit comprising:

control means that generates a signal depending on a selecting operation performed by an operator;

hydraulic actuators for respectively driving two kinds of working devices, the hydraulic actuators being driven by a drive circuit having two kinds of circuit states that correspond to the working devices;

a directional control valve unit which, when one of the working devices is attached to the attachment, switches in response to the signal from the control means to select one of the two kinds of circuit states; and a hydraulic pilot-operated directional control valve that functions as a common control valve for controlling the operation of the hydraulic actuators for driving the working devices and that is operated by a remote control valve, wherein the directional control valve unit includes a hydraulic pilot-operated main directional control valve that switches depending on whether a pilot pressure is supplied or shut off to generate the two kinds of circuit states and first and second solenoid valves that are selectively operated on the basis of an electric signal from the control means, wherein each of the solenoid valves is connected to a pilot hydraulic power source and supplies a pilot pressure from the pilot hydraulic power source to the main directional control valve when the solenoid valve is operated, and wherein the pilot pressure from the pilot hydraulic power source is supplied to the remote control valve that operates the common control valve as a primary pressure when the solenoid valves are operated.

* * * * *